(12) United States Patent
Grüter et al.

(10) Patent No.: US 11,167,628 B2
(45) Date of Patent: Nov. 9, 2021

(54) SEALING ARRANGEMENT FOR GUIDING AND SEALING A VERTICALLY MOVABLE VEHICLE WINDOW PANE

(71) Applicant: CQLT SAARGUMMI TECHNOLOGIES S.À.R.L., Remich (LU)

(72) Inventors: Achim Grüter, Rehlingen-Siersburg (DE); Timo Laux, Nalbach (DE)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 158 days.

(21) Appl. No.: 16/608,566

(22) PCT Filed: Jun. 7, 2018

(86) PCT No.: PCT/EP2018/065018
§ 371 (c)(1),
(2) Date: Oct. 25, 2019

(87) PCT Pub. No.: WO2018/228913
PCT Pub. Date: Dec. 20, 2018

(65) Prior Publication Data
US 2020/0139798 A1    May 7, 2020

(30) Foreign Application Priority Data

Jun. 12, 2017    (DE) ............ 10 2017 112 840.9
Apr. 27, 2018    (DE) ............ 10 2018 110 218.6

(51) Int. Cl.
*E06B 7/16*    (2006.01)
*B60J 10/20*   (2016.01)
(Continued)

(52) U.S. Cl.
CPC ............ *B60J 10/20* (2016.02); *B60J 10/235* (2016.02); *B60J 10/27* (2016.02); *B60J 10/36* (2016.02);
(Continued)

(58) Field of Classification Search
CPC . B60J 10/20; B60J 10/235; B60J 10/27; B60J 10/36; B60J 10/76; B60J 10/78; B60J 10/88; B60J 10/74
(Continued)

(56) References Cited

U.S. PATENT DOCUMENTS 5,010,689 A * 4/1991 Vaughan ............... B60J 10/235
                                                            49/440
5,317,835 A * 6/1994 Dupuy .................. B60J 10/235
                                                            49/377
(Continued)

FOREIGN PATENT DOCUMENTS

DE    3921289 C1    1/1991
DE    19727010 A1   1/1999
(Continued)

OTHER PUBLICATIONS

International Search Report, dated Oct. 10, 2018, 3 Pages.
German Search Report, dated Feb. 8, 2018, 8 Pages.

*Primary Examiner* — Jerry E Redman
(74) *Attorney, Agent, or Firm* — Lucas & Mercanti, LLP; Klaus P. Stoffel

(57) ABSTRACT

A sealing arrangement for guiding and sealing a vertically movable vehicle window pane, having a plurality of strand components, which can be interlockingly and/or frictionally connected to each other and to the vehicle body, wherein the strand components include a strand component made of plastic, which extends along an upper edge of the vehicle window pane when the vehicle window is closed. The strand component made of plastic has a stopping element for
(Continued)

locking the plastic strand component in the longitudinal direction of the strand during assembly of the sealing arrangement on the vehicle body. The stopping element preferably includes at least one journal element, protruding from a longitudinal side of the plastic strand component, for engaging in an opening in the vehicle body.

16 Claims, 6 Drawing Sheets

(51) Int. Cl.
    *B60J 10/235* (2016.01)
    *B60J 10/27* (2016.01)
    *B60J 10/36* (2016.01)
    *B60J 10/76* (2016.01)
    *B60J 10/78* (2016.01)
    *B60J 10/88* (2016.01)

(52) U.S. Cl.
    CPC ............... *B60J 10/76* (2016.02); *B60J 10/78* (2016.02); *B60J 10/88* (2016.02)

(58) Field of Classification Search
    USPC .......................... 49/441, 495.1, 498.1, 482.1
    See application file for complete search history.

(56) References Cited

U.S. PATENT DOCUMENTS

| | | | |
|---|---|---|---|
| 5,740,640 A | 4/1998 | Yasuda | |
| 6,070,363 A * | 6/2000 | Vance | B29C 65/56 277/921 |
| 6,942,225 B2 | 9/2005 | Gentemann | |
| 8,312,675 B2 * | 11/2012 | Thiele | E05F 15/42 49/27 |
| 9,718,337 B2 | 8/2017 | Stephan | |
| 2001/0001917 A1 * | 5/2001 | Goto | B60J 10/30 49/440 |
| 2003/0168814 A1 * | 9/2003 | Struyven | B60J 10/79 277/402 |
| 2005/0072053 A1 * | 4/2005 | Filipczak | B60J 10/88 49/490.1 |
| 2005/0198906 A1 * | 9/2005 | Fujita | B60J 10/24 49/428 |
| 2006/0279110 A1 * | 12/2006 | Nakagawa | B60J 10/82 296/210 |
| 2007/0101656 A1 * | 5/2007 | Stipp | B60J 10/30 49/490.1 |
| 2008/0030046 A1 * | 2/2008 | Krause | B60J 10/18 296/146.2 |
| 2009/0223135 A1 * | 9/2009 | Bocutto | B60J 10/235 49/493.1 |
| 2010/0011670 A1 * | 1/2010 | O'Sullivan | B60J 10/88 49/489.1 |
| 2012/0151842 A1 | 6/2012 | Miura | |
| 2016/0318383 A1 * | 11/2016 | Stephan | B60J 10/76 |
| 2017/0028938 A1 * | 2/2017 | Yoshida | B60J 10/76 |
| 2018/0339576 A1 | 11/2018 | Heppner | |
| 2019/0193542 A1 * | 6/2019 | Prodoni | B60J 10/265 |
| 2020/0086728 A1 * | 3/2020 | Roux | B60J 10/88 |
| 2020/0139798 A1 * | 5/2020 | Gruter | B60J 10/20 |
| 2020/0307363 A1 * | 10/2020 | Carnoy | B60J 10/265 |
| 2020/0317036 A1 * | 10/2020 | Roux | B60J 10/246 |

FOREIGN PATENT DOCUMENTS

| | | |
|---|---|---|
| DE | 19826040 A1 | 9/1999 |
| DE | 20104747 U1 | 5/2002 |
| DE | 10063459 A1 | 6/2002 |
| DE | 102013108304 A1 | 2/2015 |
| DE | 102015207817 A1 | 11/2016 |
| DE | 102016200475 B3 | 12/2016 |
| GB | 2393752 A | 4/2004 |
| JP | 2003136969 A | 5/2003 |
| WO | 0142036 A1 | 6/2001 |

* cited by examiner

SEALING ARRANGEMENT FOR GUIDING AND SEALING A VERTICALLY MOVABLE VEHICLE WINDOW PANE

The present application is a 371 of International application PCT/EP2018/065018, filed Jun. 7, 2018, which claims priority of DE 10 2017 112 840.9, filed Jun. 12, 2017, and DE 10 2018 110 218.6, filed Apr. 27, 2018, the priority of these applications is hereby claimed and these applications are incorporated herein by reference.

BACKGROUND OF THE INVENTION

The invention relates to a seal arrangement for guiding and sealing a vertically movable vehicle window pane, having multiple strand components, which are able to be connected in a form- and/or force-fitting manner to one another and to the vehicle body, wherein the strand components comprise a strand component composed of plastic which, when the vehicle window is closed, extends along an upper edge of the vehicle window pane.

A seal arrangement having said features is disclosed by DE 100 63 459 A1. A plastic strand component which is able to be connected to seal strand components serves inter alia as a facing strip.

SUMMARY OF THE INVENTION

The present invention provides a new seal arrangement of the type mentioned in the introduction, which is characterized in that the strand component composed of plastic has stop means for locking the plastic strand component in a strand longitudinal direction during the fitting of the seal arrangement to the vehicle body.

Such a plastic strand component according to the invention considerably facilitates the fitting of the seal arrangement to the vehicle body in that it can serve as a carrier of further components of the arrangement for a precise placing of said components on the vehicle.

While a depression in the plastic strand component would be conceivable as a stop means, into which depression a body projection engages, in a preferred embodiment of the invention, provision is made of at least one pin element, projecting from a longitudinal side of the plastic strand component transversely with respect to the strand longitudinal direction, for engagement into an opening in the vehicle body. The pin element possibly latches into the opening.

In a preferred embodiment of the invention, the strand component composed of plastic is able to be connected to seal strand components extending along said component and comprising elastomer material. Preferably provision is made of plug-in connections, possibly latching-in plug-in connections.

Expediently, at least one of the seal strand components extending along the plastic strand component has stop means for locking the seal strand component to the plastic strand component in a strand longitudinal direction.

In the case of the seal strand component being prefitted to the plastic strand component, it is in this manner possible prior to the placement thereof on the vehicle body for the seal strand component to be positioned exactly on the plastic strand component. After the assembly prefabricated in this manner has been fitted to the vehicle body, not only the plastic strand component but also the seal strand component is then placed exactly at the desired location on the vehicle body.

As in the case of the stop means of the plastic strand component, the stop means of the seal strand component may be a pin element projecting transversely with respect to the strand longitudinal direction, for engagement into a plug opening at the plastic strand component in this case.

In a further embodiment of the invention, the seal strand components extending along the plastic strand component comprise a first component for sealing the vehicle window pane on the outer side and a second component for sealing the vehicle window pane on the inner side.

In this case, the first component may furthermore be provided for sealing with respect to the door frame a vehicle door which has the vehicle window pane.

The two components which are able to be connected to the plastic strand component are furthermore each able to be connected to window frame limbs of a vehicle door and are in particular arranged spaced apart from one another.

In a particularly preferred embodiment of the invention, the strand component composed of plastic is furthermore able to be connected to a B pillar facing, which is able to be plugged onto, in particular is able to be plugged with latching-in action onto, the plastic strand component transversely with respect to the strand longitudinal direction.

In a further particularly preferred embodiment of the invention, the strand component composed of plastic is furthermore able to be connected to a component, in particular an encapsulated triangular window, which is provided for being fitted to an A pillar or C pillar.

The B pillar facing or the component preferably has devices for holding and guiding vertically extending seal strand components.

Expediently, a vertically extending portion of the second component, which seals the vehicle window pane on the inner side, is held and guided by the holding and guiding devices of the B pillar lining.

Said portion of the second component may be able to be plugged longitudinally with a plug part into a plug recess at the B pillar lining, and in particular latch in there.

The holding and guiding devices of the B pillar lining expediently have a receiving shaft for a vertically extending seal strand component for sealing the vehicle window pane on the outer side.

In a further embodiment of the invention, the component arranged at the A or C pillar comprises a U-shaped profile rail for receiving a U-shaped seal strand component both for the inner-side and for the outer-side sealing of the vehicle window pane.

The seal arrangement according to the invention, which is able to be made up of multiple components, makes possible a large number of variants, wherein differences, for example differences in color, between the variants can be advantageously limited to individual components and the remaining components can remain unchanged. The strand component composed of plastic according to the invention, which especially has a carrying and connecting function, may, as an individual constituent part of the seal arrangement, be adapted to different body geometries, that is to say different vehicle types, wherein, for the remaining components, it is advantageously possible for use to be made of the same standard profiles, for example composed of EPDM, with all vehicle types.

Furthermore, multi-component seal arrangements permit machining processes, which would impair the seal arrangement in its entirety, to be advantageously limited to individual components, for example painting or flocking.

A further advantage of multi-component seal arrangements is that the complexity of the profiles of the individual components be low and said components may be extruded as a double strand, wherein at the same time, seal profiles for the right and left sides of the vehicle are formed. Finally, multi-component seal arrangements permit the use of materials which are optimized for the individual components.

BRIEF DESCRIPTION OF THE DRAWING

The invention is explained in more detail below on the basis of exemplary embodiments and the appended drawings which are related to said exemplary embodiments and in which.

DETAILED DESCRIPTION OF THE INVENTION

A seal arrangement having multiple strand components and serving for guiding and sealing a vertically movable vehicle window pane in a front door of the vehicle comprises a strand component 1 composed of a plastic, for example polypropylene or polyamide, possibly glass fiber-reinforced, and strand components 2 to 4 composed of an elastomer material, for example EPDM. The plastic strand component 1 is able to be connected to a B pillar lining 6 and to a component 7 in the form of an encapsulated triangular pane. Instead of the encapsulated triangular pane, a facing or exterior mirror unit could also be considered as the component 7.

Figure 11:
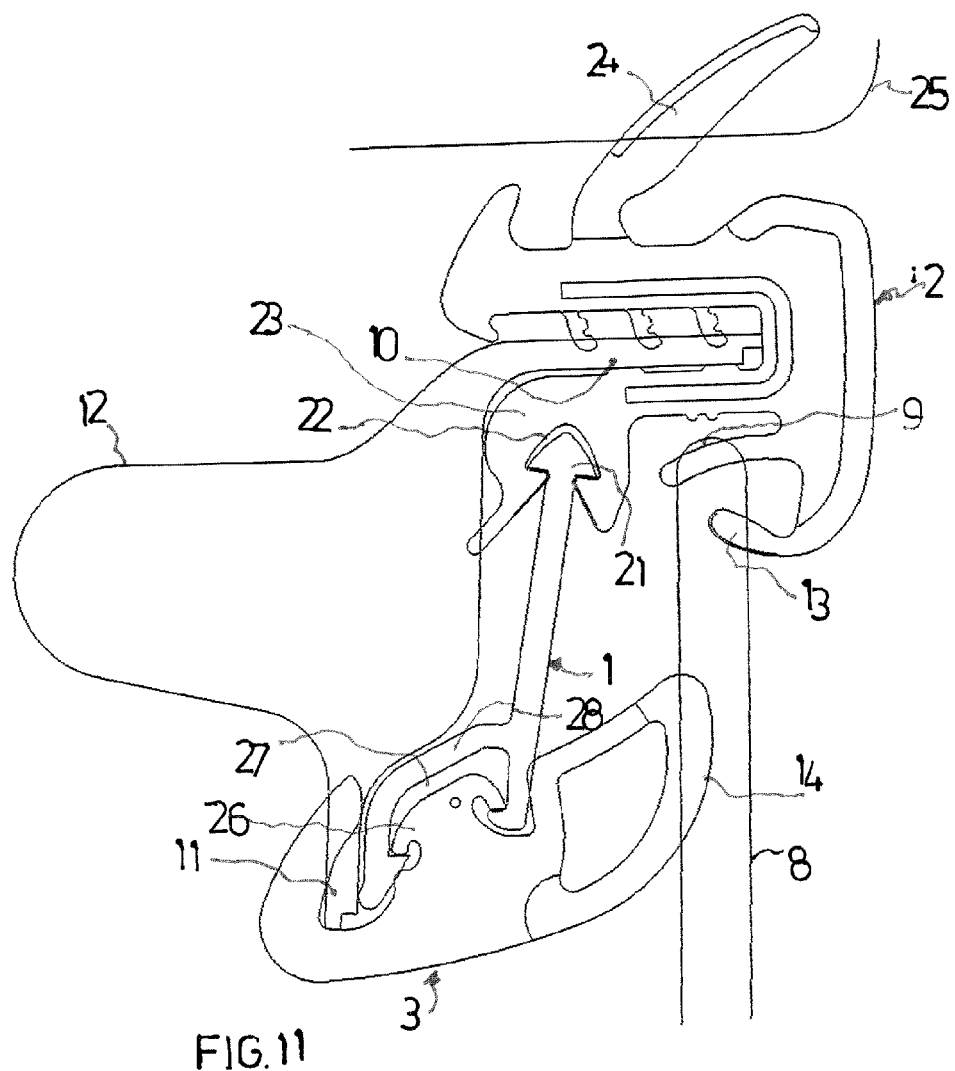
FIG. 11 shows a cross-sectional illustration explaining the sealing by the seal arrangement at the upper pane edge of a vehicle window pane.
Figure 12:
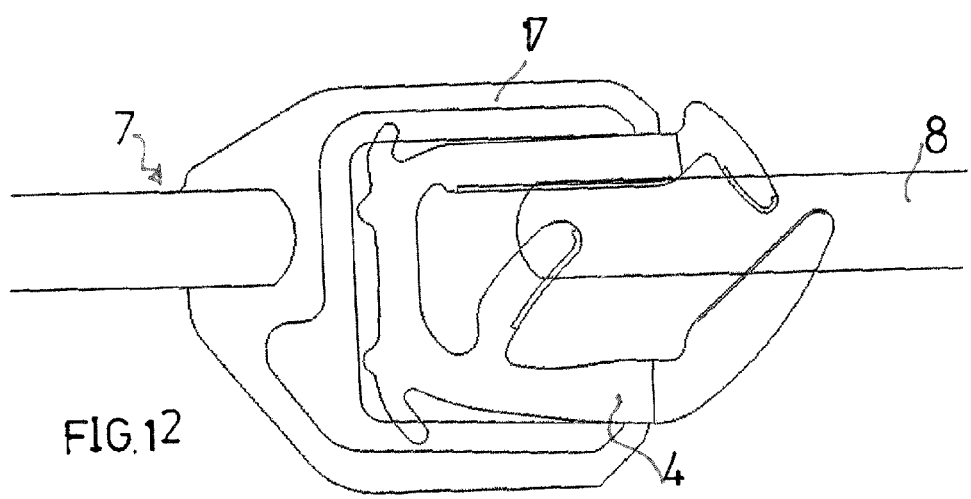
FIG. 12 shows a cross-sectional illustration explaining the sealing of a vehicle window pane at the front pane edge by the seal arrangement.

When the vehicle window 8 is closed, the strand components 1 and 2 and also, in part, the strand component 3 extend along an upper edge 9 of the vehicle window pane 8 (shown in FIG. 11). As can further be seen in FIG. 11, the seal strand components 2 and 3 are connected in each case to a door window frame 12 of a vehicle door via a flange 10 or 11 and to one another via the plastic strand component 1. When the vehicle window is closed, the seal strand component 2 seals the window pane 8 on the outside of the upper edge 9 by way of two sealing lips 13. A hose-like seal portion 14 of the seal strand component 3 serves for the sealing on the pane inner side.

While the seal strand component 3 is bent off, and continued vertically downward, at an extension 15 of the plastic strand component 1, an exclusively vertically extending seal strand component 5 performs the sealing of the vehicle window pane 8 on the outer pane thereof. Both the vertically extending portion of the seal strand component 3 and the seal strand component 5 are connected to the B pillar facing 6, which for its part is connected to the plastic strand component 1. The seal strand component 5 abuts with an end surface 16 against a longitudinal side of the seal strand component 2.

The seal strand component 4, which faces the component 7, has a U-shaped cross section and, via its two U-shaped limbs, seals the vehicle window pane 8 close to the vertical edge thereof, which is at the front in the direction of travel, both on the pane inner side and the pane outer side.

The seal strand component 4 is held in a U-shaped profile 17 connected to the triangular pane of the component 7 and abuts with a beveled end surface 18 against the seal strand component 3. The U-shaped profile 17 is able to be connected via connecting clips 19 and 20 to the plastic strand component 1 or to the vehicle door within the window shaft. Both the seal strand component 4 and the seal strand components 3 and 5 project into the window shaft of the vehicle door.

As can be seen in FIG. 11, the plastic strand component 1 is able to be plugged longitudinally onto the seal strand component 2, wherein an undercut plug pin 21 of the plastic strand component 1 engages with latching-in action into a plug recess 22 which is formed in a limb 23 of a U-shaped fastening portion of the seal strand component 2. A sealing lip 24 connected to the other U-shaped limb serves additionally for sealing the door gap with respect to the door frame of the vehicle body 25.

An undercut plug element 26 which is mushroom-shaped in cross section serves for connecting the plastic strand component 1 to the seal strand component 3. A plug opening 27 into which the plug element 26 latches is formed by a foot part 28 of the plastic strand component 1. A lip 33 of the seal strand component 3 engages behind the flange 10 at the door window frame 12.

Figure 13:
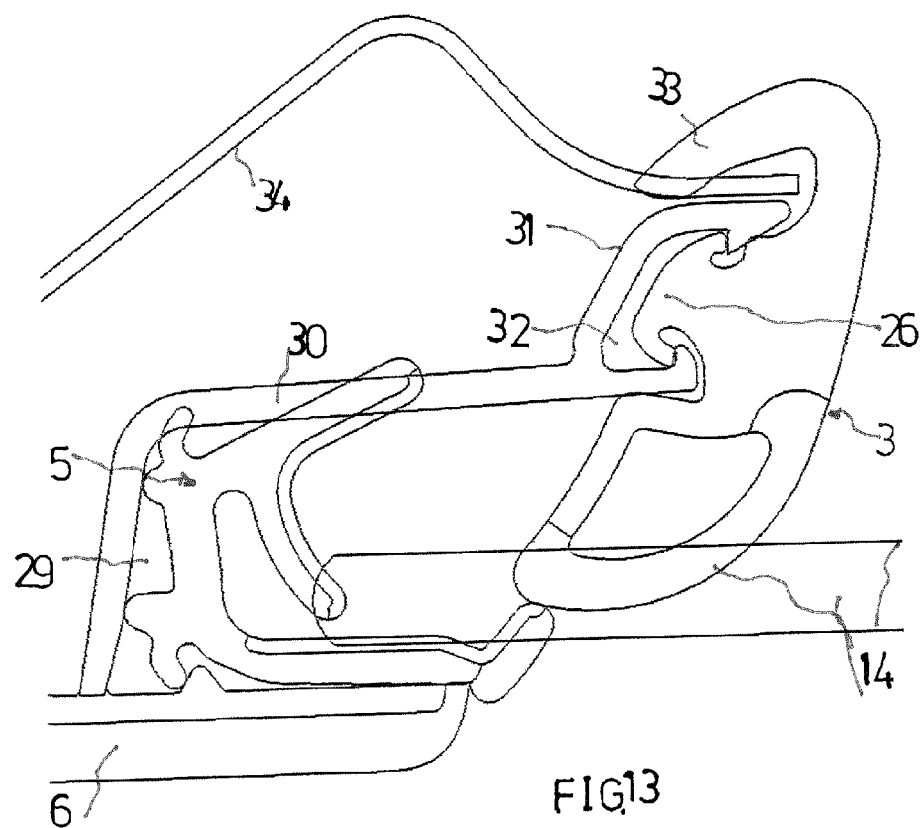
FIG. 13 shows a cross-sectional illustration explaining the sealing of a vehicle window pane at the rear pane edge by the seal arrangement according to the invention.

As can be seen in FIG. 13, the seal strand component 5, which has a U-shaped cross section, is able to be clamped in a shaft 29 which is formed by an angled extension 30 on the B pillar facing 6. The angled extension 30 comprises a foot part 31 for forming a plug opening 32 into which the mushroom-shaped plug element 26 of the continuously routed seal strand component 3 is able to be plugged with latching-in action. The lip 33 of the seal strand component 3 engages behind a body plate 34 of the vehicle door.

Figure 1:
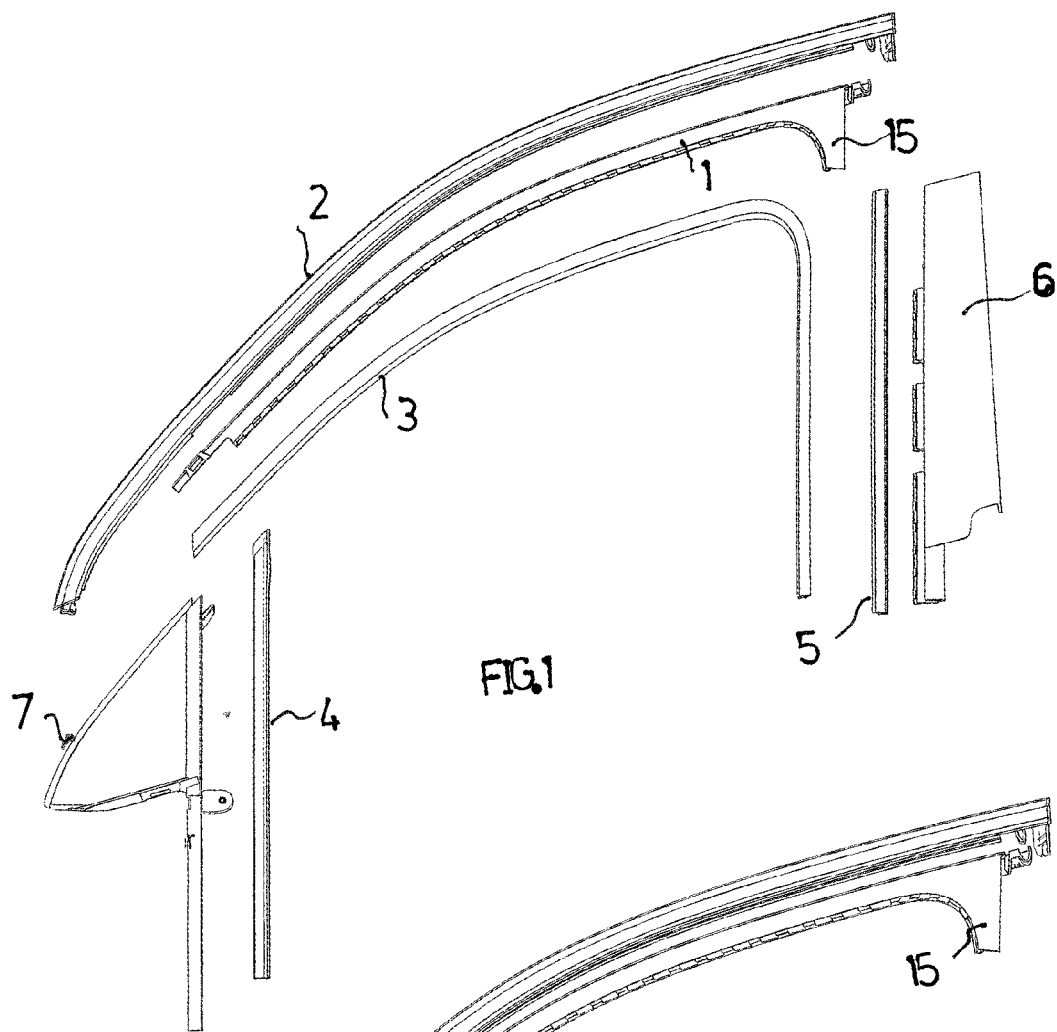
FIG. 1 shows, in an exploded illustration, a first exemplary embodiment of a seal arrangement according to the invention for a front vehicle door.
Figure 2:
FIG. 2 shows a seal strand component of the arrangement in FIG. 1, which is prefitted to a plastic strand component of the arrangement in FIG. 1.
Figure 3:
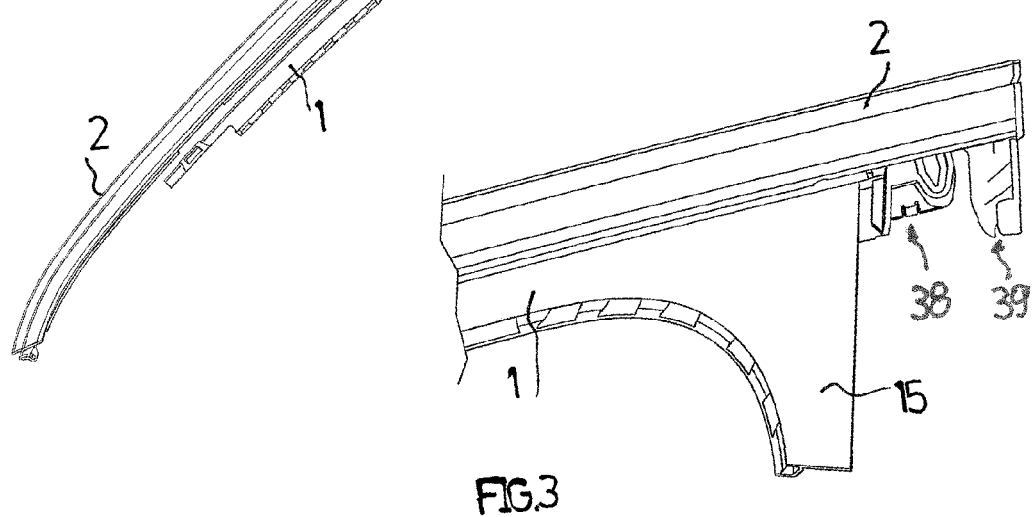
FIG. 3 shows a detail of the view in FIG. 2.
Figure 4:
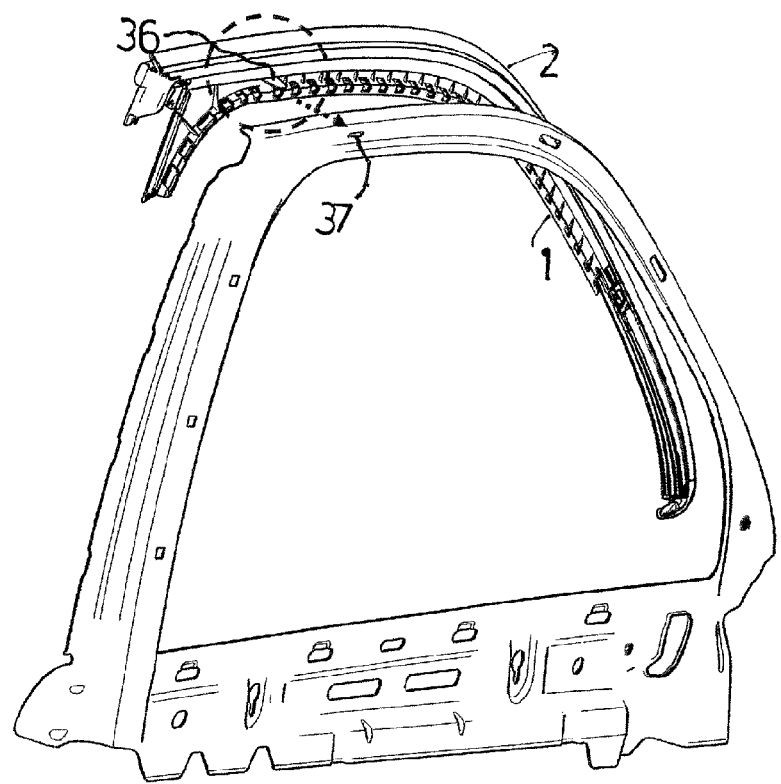
FIG. 4 shows an illustration explaining the fitting of the seal arrangement in FIG. 1 to a vehicle door.
Figure 5:
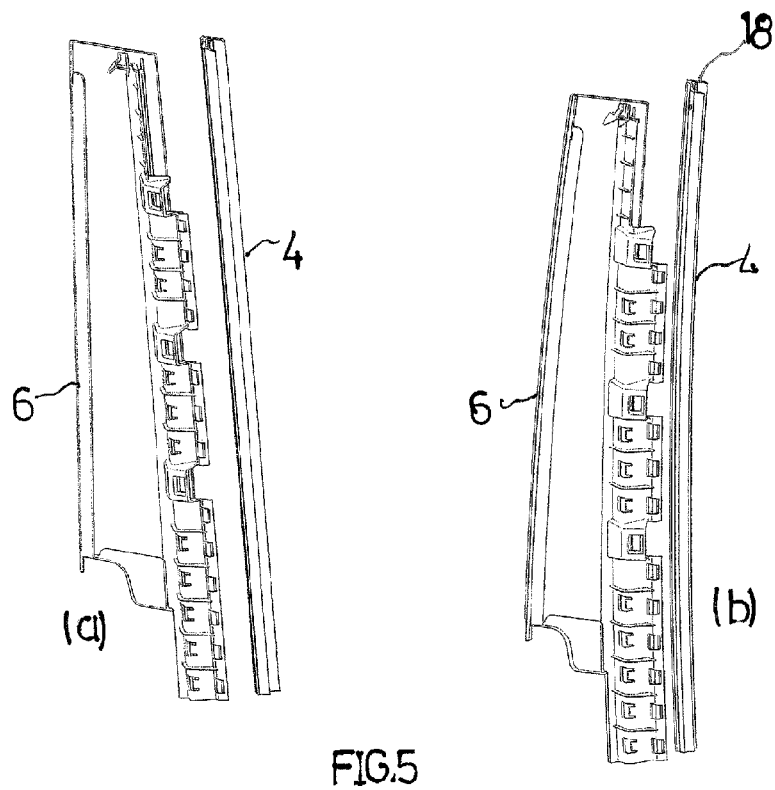
FIG. 5 shows views of a B pillar lining and of a vertically extending seal strand component held by the lining.
Figure 6:
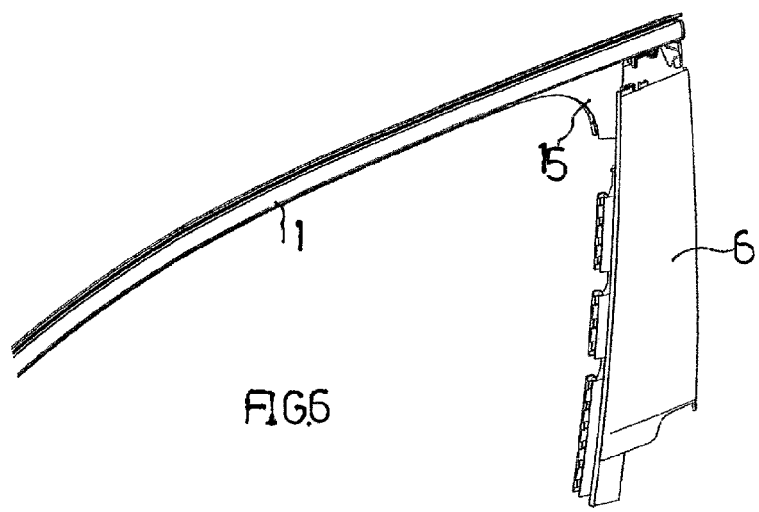
FIGS. 6 and 7 show illustrations explaining the fitting of a B pillar lining to a plastic strand component.
Figure 7:
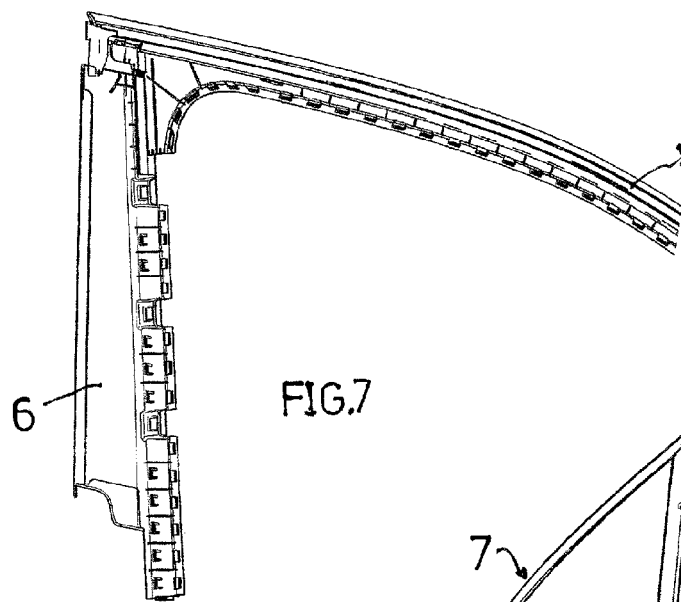
Figure 8:
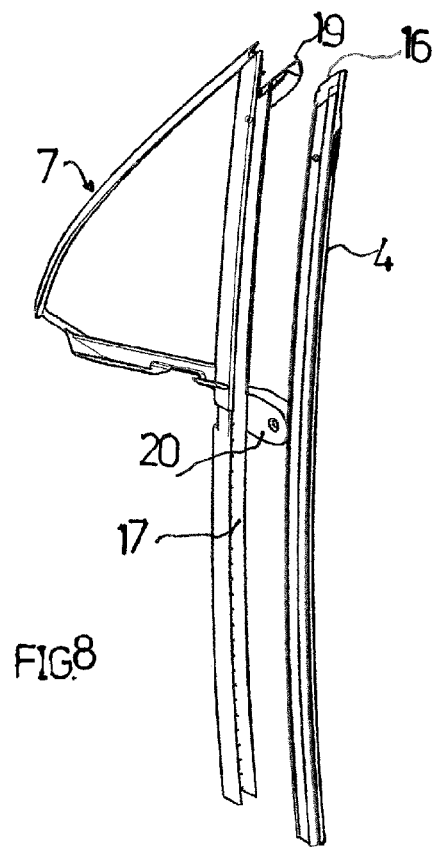
FIG. 8 shows an illustration explaining the fitting of a vertical seal strand element to a component comprising a triangular pane.
Figure 9:
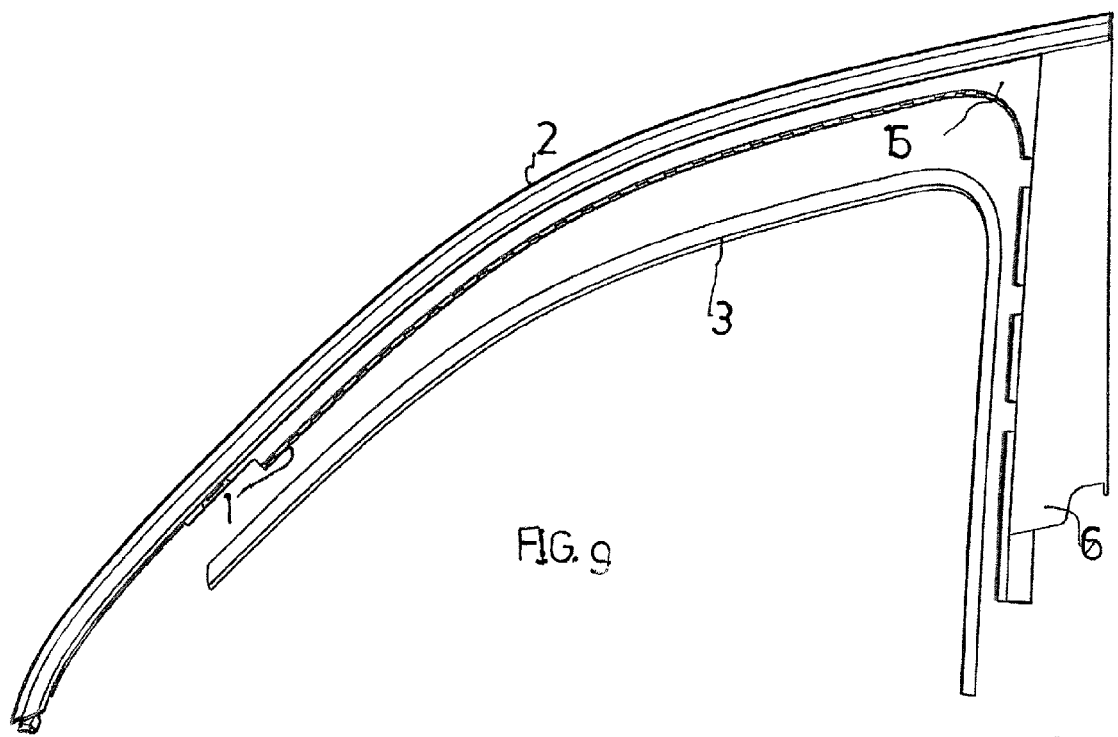
FIGS. 9 and 10 show illustrations explaining the fitting of a further seal strand component.
Figure 10:
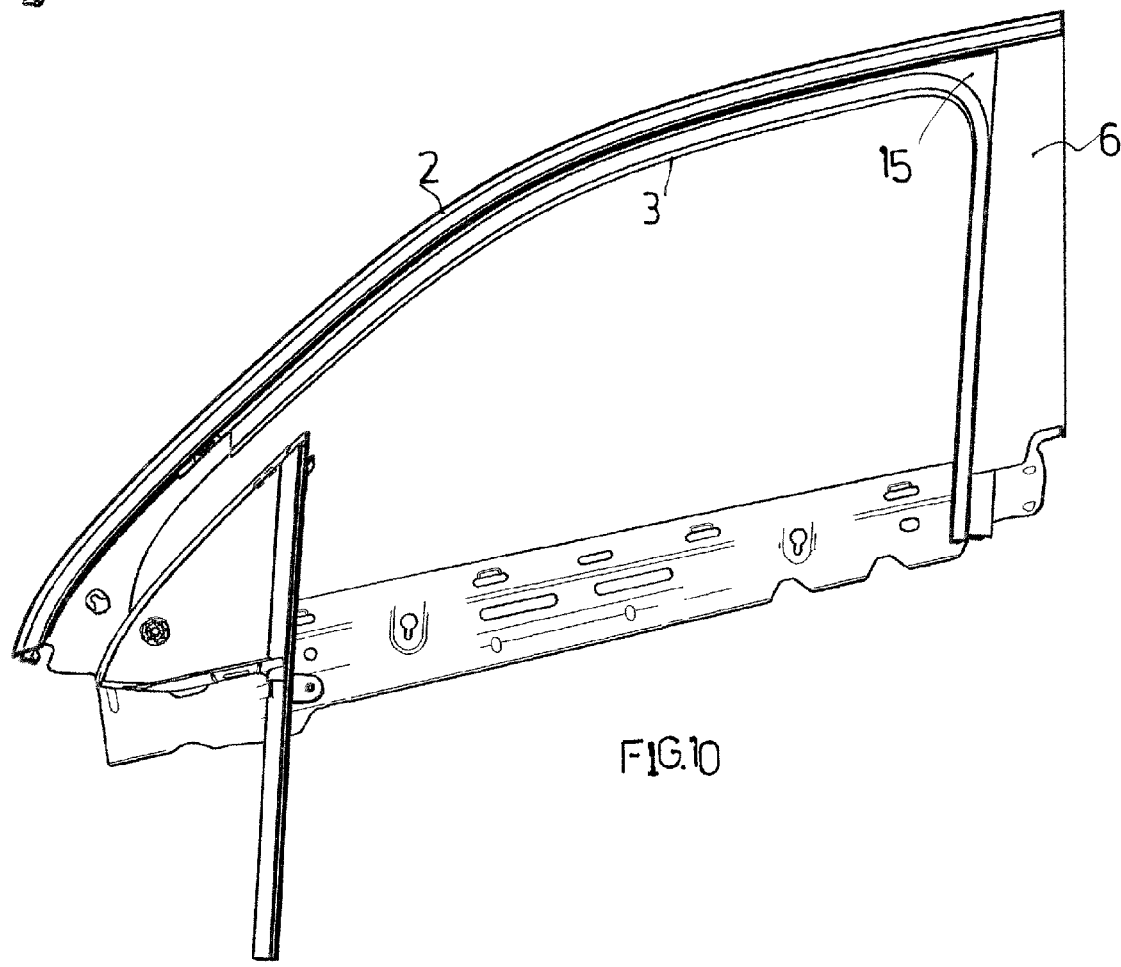

Expediently, prior to the previously described seal arrangement being fitted to a vehicle door, the plastic strand component 1 and the seal strand component 2 are connected to one another, wherein the maintenance of a desired longitudinal position of the seal strand component 2 on the plastic strand component 1 is ensured by a plug pin 34 which projects from the seal strand component 2 and which engages into a corresponding plug opening 35 on the plastic strand component 1. The assembly prefabricated in this manner can be fitted in its entirety, wherein the exact position of said assembly at the vehicle body is ensured by a plug element 36 which projects from the plastic strand component 1 transversely with respect to the longitudinal direction thereof. The plug element 36, shown in FIG. 4, engages into an opening 37 in the body plate of the vehicle door frame.

By way of the pin element 36, plug elements 38 are exactly positioned for a plug-in connection of the plastic strand component 1 to the B pillar lining 7, with the result that the B pillar lining is also situated in the desired position. It would also be possible for the B pillar lining 6 to be connected to the plastic strand component 1 prior to the fitting of an assembly comprising said lining. With this connection, a plug pin 39 of the seal strand component 2 furthermore engages into a corresponding opening provided on the B pillar facing. It goes without saying that corresponding plug openings are arranged out of sight on the inner side of the B pillar lining.

Prior to or following the previously described fitting steps, the fitting of the component 7 to the vehicle door is realized. Finally, the seal strand components 3, 4 and 5 are fitted, wherein the seal strand component 3 is pressed with the mushroom-shaped plug pin 21 into the plug openings 27 and 32, and the seal strand components 4 and 5 are pressed into the groove-like receiving seats thereof and clamped.

Figure 14:
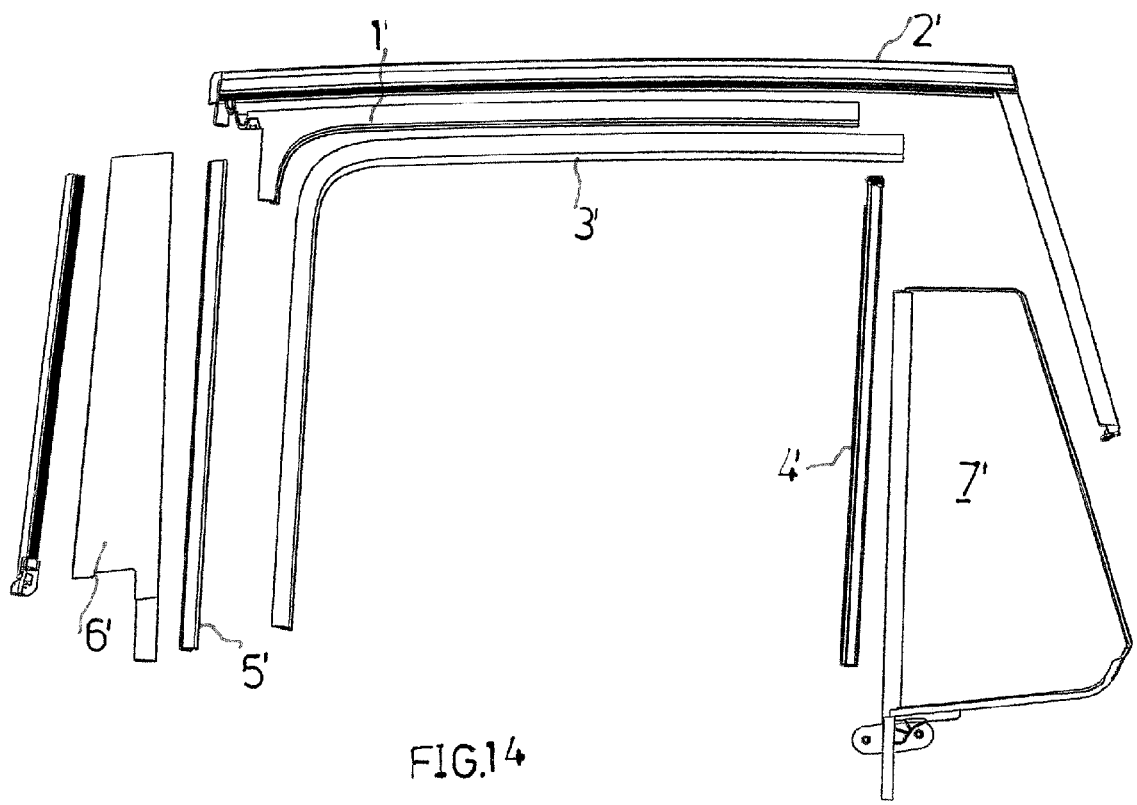
FIG. 14 shows, in an exploded illustration, a further exemplary embodiment for a seal arrangement according to the invention at a rear vehicle door.

FIG. 14 shows a corresponding seal arrangement for a rear vehicle door, which seal arrangement is made up of multiple strand components. The arrangement comprises a plastic strand component 1', a seal strand component 2' for sealing the vehicle pane on the outer side, a seal strand component 3' for sealing the vehicle window pane on the inner side, a vertical seal strand component 4 provided for sealing the vehicle window pane on both sides and facing a C pillar, and a seal strand component 5' facing a B pillar. The seal strand component 5' and a bent-off part of the seal strand component 3' are able to be connected to the B pillar facing 6'. The seal strand component 4' is able to be connected to a U-shaped profile of a component 7' in the form of an encapsulated window pane at the C pillar. Like the plastic strand component 1, the plastic strand component 1' also has a projecting pin element 7 (not shown), which is able to be plugged into an opening in the body plate of the window frame and ensures, in particular in the vehicle longitudinal direction, accurate positioning of the plastic strand component 1 and thus of the components connected thereto.

The invention claimed is:

1. A seal arrangement for guiding and sealing a vertically movable vehicle window pane, comprising multiple strand components that are connectable to one another and to a vehicle body in a form- and/or force-fitting manner, wherein the strand components comprise a plastic strand component composed of plastic which, when the vehicle window pane is closed, extends along an upper edge of the vehicle window pane, wherein the plastic strand component has a stop that locks the plastic strand component in a longitudinal direction of the plastic strand component during fitting of the seal arrangement to the vehicle body, wherein the plastic strand component is connectable to other of the strand components that extend along the plastic strand component and comprise elastomer material, wherein at least one of the other of the strand components extending along the plastic strand component has a stop that locks the at least one of the other of the seal strand components to the plastic strand component in a strand longitudinal direction.

2. The seal arrangement according to claim 1, wherein the stop includes at least one pin element projecting from a longitudinal side of the plastic strand component transversely with respect to the strand longitudinal direction for engagement into an opening in the vehicle body, wherein the pin element is latchable into the opening.

3. The seal arrangement according to claim 1, wherein the plastic strand component is connected to the other of the strand components by plug-in connections.

4. The seal arrangement according to claim 3, wherein the plug-in connections are latching plug-in connections.

5. The seal arrangement according to claim 1, wherein the stop includes a pin element for engagement into a plug opening in the plastic strand component, wherein the pin element projects transversely with respect to the strand longitudinal direction.

6. The seal arrangement according to claim 1, wherein seal strand components extending along the plastic strand component comprise a first component for sealing the vehicle window pane on an outer side and a second component for sealing the vehicle window pane on an inner side.

7. The seal arrangement according to claim 6, wherein the first component is configured to seal a vehicle door that has the vehicle window pane relative to a door frame.

8. The seal arrangement according to claim 6, wherein the first and second components, which are connectable to the plastic strand component, are additionally connectable to window frame limbs of a vehicle door so as to be spaced apart from one another.

9. The seal arrangement according to claim 1, wherein the plastic strand component is connectable to a B pillar facing, which is plugable onto the plastic strand component transversely with respect to the strand longitudinal direction.

10. The seal arrangement according to claim 9, wherein the plastic strand component is connectable to a component provided for being fitted to an A pillar or C pillar.

11. The seal arrangement according to claim 10, wherein the plastic strand component is connectable to an encapsulated triangular window.

12. The seal arrangement according to claim 11, wherein the multiple strand components include a vertically extending strand component, wherein the B pillar facing or the component provided for being fitted to an A pillar or C pillar is provided with devices for holding and guiding the vertically extending strand component.

13. The seal arrangement according to claim 12, wherein a vertically extending portion of a second of the strand components, which seals the vehicle window pane on an inner side, is held by the holding and guiding devices of the B pillar facing.

14. The seal arrangement according to claim 13, wherein the vertically extending portion of the second component is plugged with a plug part into a plug recess at the B pillar facing.

15. The seal arrangement according to claim 12, wherein the holding and guiding devices of the B pillar facing have a receiving shaft for a vertically extending of the strand components for sealing the vehicle window pane on an outer side.

16. The seal arrangement according to claim 10, wherein one of the strand components is U-shaped, the component provided for being fitted to an A pillar or C pillar having a U-shaped profile rail for receiving the U-shaped strand component for inner-side and outer-side sealing of the vehicle window pane.

* * * * *